(12) United States Patent  
Franke et al.

(10) Patent No.: US 8,902,886 B2  
(45) Date of Patent: Dec. 2, 2014

(54) CANONICALIZATION OF NETWORK PROTOCOL HEADERS

(75) Inventors: Hubertus Franke, Cortlandt Manor, NY (US); Douglas M. Freimuth, New York, NY (US); David P. Olshefski, Danbury, CT (US); John Tracey, Scarsdale, NY (US); Dinesh Verma, New Castle, NY (US); Charles P. Wright, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 12/428,992

(22) Filed: Apr. 23, 2009

(65) Prior Publication Data

US 2010/0272125 A1 Oct. 28, 2010

(51) Int. Cl.
*H04L 12/28* (2006.01)
*H04J 3/00* (2006.01)
*G06F 15/167* (2006.01)
*G06F 15/16* (2006.01)
*H04L 29/06* (2006.01)

(52) U.S. Cl.
CPC ............... *H04L 69/22* (2013.01); *H04L 69/12* (2013.01)

USPC ............ 370/389; 370/476; 709/212; 709/231

(58) Field of Classification Search
USPC .......................................................... 370/476
See application file for complete search history.

(56) References Cited

U.S. PATENT DOCUMENTS

| | | | |
|---|---|---|---|
| 6,006,268 A * | 12/1999 | Coile et al. .................... 709/227 |
| 6,356,951 B1 * | 3/2002 | Gentry, Jr. .................... 709/250 |
| 2006/0092934 A1 * | 5/2006 | Chung et al. .................. 370/389 |
| 2006/0282542 A1 * | 12/2006 | Pinckney et al. ............. 709/231 |
| 2007/0005801 A1 * | 1/2007 | Kumar et al. ................. 709/238 |
| 2008/0130648 A1 * | 6/2008 | Ra et al. ........................ 370/392 |
| 2009/0125604 A1 * | 5/2009 | Chang et al. .................. 709/212 |

* cited by examiner

*Primary Examiner* — Brandon Renner

(74) *Attorney, Agent, or Firm* — F. Chau & Associates, LLC

(57) ABSTRACT

A method for generating network traffic includes receiving packet header information and an optional packet payload. The received packet header information is arranged in accordance with a predetermined format. A packet of data including the packet payload and a packet header is formatted in accordance with the arranged header information. The predetermined format specifies a particular order in which packet headers are to be arranged.

19 Claims, 7 Drawing Sheets

Fig. 5

```
501.INVITE sip:6110@studebaker.watson.ibm.com SIP/2.0
502.Via: SIP/2.0/UDP
    9.2.84.190:1000;rport;branch=z9hG4bK090254be0000001b499b591d000
    05c790000000e
503.Content-Length: 333
504.Contact: <sip:jmtracey@9.2.84.190:1000>
505.Call-ID: 95D11A73-4408-4C56-B966-F5B465865B1F@9.2.84.190
506.Content-Type: application/sdp
507.CSeq: 1 INVITE
508.From:
    "unknown"<sip:jmtracey@studebaker.watson.ibm.com>;tag=3113517115
    103
509.Max-Forwards: 70
510. To: <sip:6110@studebaker.watson.ibm.com>
511. User-Agent: SJphone/1.60.289a (SJ Labs)
```

Fig. 6

601. INVITE sip:traceyj@9.2.9.243:5060;transport=udp SIP/2.0
602. Via: SIP/2.0/UDP 9.2.12.217:5060;branch=z9hG4bK2fe238de;rport
603. From: "unknown" <sip:jmtracey@9.2.12.217>;tag=as549a2bca
604. To: <sip:traceyj@9.2.9.244:5060;transport=udp>
605. Contact: <sip:jmtracey@9.2.12.217>
606. Call-ID: 7ce73ba5162866dc0575cf5b7be7016c@9.2.12.217
607. CSeq: 102 INVITE
608. User-Agent: Asterisk PBX
609. Max-Forwards: 70
610. Date: Wed, 18 Feb 2009 00:41:01 GMT
611. Allow: INVITE, ACK, CANCEL, OPTIONS, BYE, REFER, SUBSCRIBE, NOTIFY
612. Content-Type: application/sdp
613. Content-Length: 494

CANONICALIZATION OF NETWORK PROTOCOL HEADERS

BACKGROUND OF THE INVENTION

1. Technical Field

The present disclosure relates to network protocol headers and, more specifically, to canonicalization of network protocol headers.

2. Discussion of Related Art

Network protocols such as Session Initiation Protocol (SIP) and Hypertext Transport Protocol (HTTP) were designed to allow for a great deal of flexibility in terms of how packets of data are formed. The order in which certain header fields may appear has no influence on the function of the packet. For example, each packet may have an order and format of protocol headers that may vary significantly without compromising the ability of diverse network devices to read and decode the packets of data. In a SIP packet, the "To:" and "From:" header fields can appear either with the "To:" before the "From:" or with the "From:" before the "To:". The SIP header format also allows headers that list multiple data elements, for example, multiple servers along a route, to be represented either via a comma separated list following a single instance of the header field, or equivalently as multiple instances of the header field, each with one or more instances of data. This level of flexibility allows for new network devices to add and change packet header information without breaking compatibility with existing network devices.

While this level of flexibility has allowed network traffic technology to progress while maintaining some level of backwards compatibility and generally simplifies the generation of protocol headers, the enhanced flexibility does add to the computational burden of receiving network device that must parse the protocol headers of each packet. This complexity tends to make protocol header parsing a very CPU and memory intensive operation. This is because the algorithms that parse protocol headers must be more complex than if the exact format were to be known. The realities of modern network traffic greatly exacerbate this problem as emerging technologies such as voice over internet protocol (VoIP) demand nearly instantaneous processing of packets of data with significant payloads. In these and other applications, the burdens associated with parsing protocol headers may require increasingly sophisticated and expensive network hardware that is able to provide the needed CPU and memory resources. The great expense and sophistication of this equipment may hinder the adoption of new technologies such as VoIP and may therefore stifle further development.

SUMMARY

A method for generating network traffic includes receiving packet header information and an optional packet payload. The received packet header information is arranged in accordance with a predetermined format. A packet of data including the packet payload and a packet header is formatted in accordance with the arranged header information. The predetermined format specifies a particular order in which packet headers are to be arranged.

The predetermined format may also specify a particular order in which packet header fields are to be arranged. The packet of data may be formatted to include a checksum field in addition to the packet payload and a packet header formatted in accordance with the arranged header information. The checksum field may be used to indicate whether the formatting of the packet headers has been altered.

The packet of data may adhere to one or more protocols including application protocols such as SIP and HTTP, and/or network transport protocols such as IPv4, IPv6, TCP, UDP, and/or SCTP.

The method for generating network traffic may be applied to an existing packet of data to convert that existing packet of data into a packet of data having a packet header formatted in accordance with the arranged header information.

A method for processing network traffic includes receiving a packet. It is determined whether the received packet conforms to a predetermined format specifying a particular order in which packet headers are arranged. When it is determined that the packet conforms to the predetermined format, the packet is processed by parsing header information of the packet in accordance with the predetermined format. When it is determined that the packet does not conform to the predetermined format, the packet is processed by parsing header information of the packet in an arbitrary fashion. Parsing header information of the packet in an arbitrary fashion is more computationally expensive than parsing header information of the packet in accordance with the predetermined format.

The predetermined format may also specify a particular order in which packet header fields are to be arranged. Determining whether the received packet conforms to a predetermined format may include performing a checksum on the entire received packet to verify that the checksum is equal to a predetermined value. Determining whether the received packet conforms to the predetermined format may include detecting the presence of a checksum value within the received packet, computing a checksum over the entire packet, comparing the computed checksum to the checksum value within the received packet, and determining that the received packet conforms to the predetermined format when the computed checksum equals the checksum value within the received packet.

The packet of data may adhere to one or more protocols including application protocols such as SIP and HTTP, and/or network transport protocols such as IPv4, IPv6, TCP, UDP, and/or SCTP.

A method for generating network traffic includes receiving packet header information and a packet payload. A header index is generated based on formatting of the received packet header information. A packet of data is formed including the packet payload, the packet header information, and the header index.

The header index may specify a particular order in which packet header fields are to be arranged. The header index may specify a particular offset of each individual header of the header information. The packet of data may be formed to include a checksum field in addition to the packet payload, the packet header information, and the header index. The checksum field may be used to indicate whether the formatting of the packet headers has been altered.

The packet of data may adhere to one or more protocols including application protocols such as SIP and HTTP, and/or network transport protocols such as IPv4, IPv6, TCP, UDP, and/or SCTP.

The method for generating network traffic may be applied to an existing packet of data to convert that existing packet of data into a packet of data having a header index.

A method for processing network traffic includes receiving a packet. It is determined whether the received packet includes a header index based on formatting of header information of the received packet. When it is determined that the packet includes the header index, the packet is processed by parsing the header information of the packet in accordance with the header index. When it is determined that the packet does not include the header index, the packet is processed by parsing the header information of the packet in an arbitrary fashion, wherein parsing header information of the packet in an arbitrary fashion is more computationally expensive than parsing header information of the packet with the header index.

The header index may specify a particular order in which packet header fields are to be arranged. The header index may specify a particular offset of each individual header of the header information. Determining whether the received packet includes a header index may include performing a checksum on the protocol headers to verify that the checksum is equal to a predetermined value. Determining whether the received packet includes the header index may include detecting the presence of a checksum value within the received packet, computing a checksum over the entire packet, comparing the computed checksum to the checksum value within the received packet, and determining that the received packet includes the header index when the computed checksum equals the checksum value within the received packet.

The packet of data may adhere to one or more protocols including application protocols such as SIP and HTTP, and/or network transport protocols such as IPv4, IPv6, TCP, UDP, and/or SCTP.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 5 is a diagram illustrating SIP headers for SIP INVITE operations according to exemplary embodiments of the present invention;

FIG. 6 is a diagram illustrating SIP headers for SIP INVITE operations according to exemplary embodiments of the present invention.

DETAILED DESCRIPTION OF THE DRAWINGS

Figure 1:
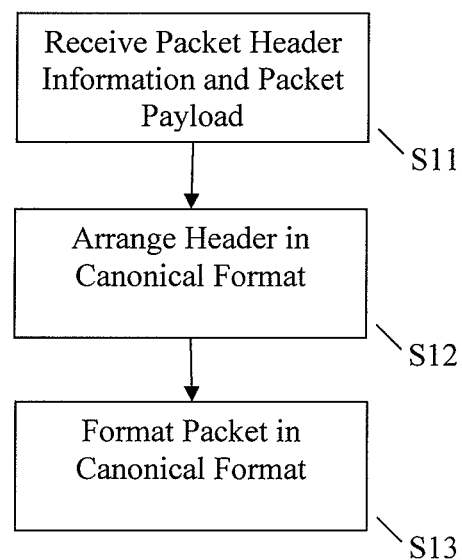
FIG. 1 is a flow chart illustrating a method for generating network traffic that conforms to a canonical format according to an exemplary embodiment of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide an approach for formatting and decoding network protocol headers in packets of data that are communicated over a computer network, such as intranets or the Internet, such that the protocol headers may be parsed more quickly and efficiently with respect to the use of computational and storage resources. By providing for this new approach to formatting and decoding network protocol headers, network devices that send, receive, and consume data packets may perform more quickly and without the need for expensive and sophisticated CPU and memory technology.

According to exemplary embodiments of the present invention, significant computational savings can be achieved by utilizing a predetermined or otherwise well understood organization of information contained within the sum of protocol headers. By using the well understood organization, receiving devices can more easily process the packets of data as less time and effort is spent on parsing network protocol headers.

Exemplary embodiments of the present invention contemplate implementing this well understood organization in one of two approaches, although the invention is not limited to either of these specific implementations, and other implementations may be performed within the scope of the present invention. In the first approach, a canonical format is used for packet headers. In the canonical format, the headers and representing information contained in the headers are arranged in a single, mutually agreed upon manner. Because the canonical format is one of many possible formats that conform to the original protocol specifications, no changes would be needed for network components to work with the canonical format. However, network elements can be designed or modified to detect headers that are in the canonical format and process the associated packets of data in a highly optimized fashion. The benefits of this optimization may be particularly significant in cases where the canonical format is used again and again as a network stream traverses numerous servers.

The canonical format itself is of no particular significance. What is significant is that the same canonical format may be used by multiple network elements so that the formatting may be well understood and this understanding may be used to more efficiently parse the network headers. However, as discussed above, the selected canonical format may conform to the original protocol specifications. For example, where the original protocol specifications allow for an arbitrary arrangement of headers, the canonical format may represent a specific arrangement of headers that is within the bounds specified by the protocol. Accordingly, conventional network elements may be able to freely process the network traffic that is in the canonical format without any modification, while network elements that have been designed or modified to make use of the canonical format may process the headers in the enhanced manner described above.

However, a packet of data that has been placed into canonical format might not remain in canonical formation. For example, conventional network elements that are not aware of the canonical format may modify the headers of packets and in so doing may break the canonical format. Exemplary embodiments of the present invention are robust enough to handle packets with headers that are not in the canonical format such as packets of data that were never so formatted, or were once so formatted but have since had the canonical format broken by subsequent header modification. Thus network elements according to exemplary embodiments of the present invention may be able to distinguish between packets with headers in the canonical format and packets with headers that are not in the canonical format and may process packets of the former group in accordance with the enhanced approach and may process packets of the latter group conventionally. Because of the savings in processing that would result from the enhanced processing of headers that are in the canonical format, overall packet handling may still be enhanced even where not every packet is in accordance with the canonical format.

In the second approach to enhanced packet handling according to exemplary embodiments of the present invention, a new protocol header may be introduced into each packet of data. The new protocol header may be an index header that specifies the relative location of each of certain other key headers. For example, the index header may specify the precise offset of certain fields within a particular header and/or may specify the precise offset of certain headers within the packet of data. With a SIP header, for example, the index header might specify the offset within the packet for key fields such as "To:", "From:", "Contact:", etc.

The index header may be used in a manner similar to the canonical format in that the format of the packet headers may be readily appreciated by the receiving network device prior to performing header processing. In the case where the canonical format is used, the format of the packet headers is understood to be the canonical format; while in the case of the index header, the format of the packet headers may be quickly gleaned by reading the index header. The index header itself may be located in a precise location within the packet header so that the index header may be quickly located and read. The index header may, for example, be located towards the beginning of the packet headers and fields.

Regardless of whether the index header approach is used or whether the canonical format approach is used, it may be useful to provide a way of quickly and easily ensuring that the packet header format was not altered such that the packet header is either no longer in the canonical format or the packet header is no longer arranged in the manner indicated by the index header. This determination may be made quickly and easily, for example, by including a checksum value within the packet headers. The checksum value may be based on the arrangement of headers and fields such that any change made to the packet header format would be easily detectable. Accordingly, a receiving device can quickly determine whether to rely on an index header and/or canonical format or whether to parse the packet headers in the conventional manner.

The checksum value field may be similar to the TCP and IP checksum fields in that it may be designed to set the checksum of the entire packet to zero or some other predetermined value. Thus, inspection of each packet may include performing a checksum and verifying that the checksum is equal to zero. If it is found to be zero then it may be determined that the packet headers have not been altered since either being placed in canonical format or since the index header was created. If the checksum is found not to be zero then it may be determined that the packet headers are either not in canonical format or that the index header is no longer accurate. In this event, the packet may be processed in accordance with the conventional approach.

The nature of the checksum calculation may allow the checksum to be efficiently modified, without having to recalculate the checksum over the entire packet, if the packet is altered, for example, if headers are added, removed or changed. Alternatively, a cryptographically secure hash, for example, the Secure Hash Algorithm (SHA), may be used whereby changing even a single bit of the headers would require the checksum to be completely recalculated. This approach, while perhaps being slightly more computationally intensive, may decrease the chances that a valid checksum inadvertently results from an altered packet.

Backwards compatibility with network devices not enhanced in accordance with exemplary embodiments of the present invention may be maintained because conventional network receivers are designed to ignore headers/fields they do not understand, and thus, inclusion of the new checksum header/field and/or index header/field would not adversely impact network devices that do not understand the new headers/fields.

FIG. 1 is a flow chart illustrating a method for generating network traffic that conforms to a canonical format according to an exemplary embodiment of the present invention. The network traffic may either originate in the canonical form, for example, by being generated by a network device enhanced according to an exemplary embodiment of the present invention, for example, as discussed above, or the network traffic may be generated in accordance with the conventional approach and may later be converted into the canonical format. In either case, packet header information and a packet payload may be received (Step S11) by the network device that is to either generate the packet of data or convert the packet of data. Then, the received packet header information may be arranged in accordance with a predetermined canonical format (Step S12). The packet of data may then be formed to include the packet payload and a packet header that is formatted in accordance with the arranged header information (Step S13).

As described above, the predetermined format may specify a particular order in which packet headers are to be arranged. Moreover, the predetermined format may also specify a particular order in which the packet header fields are to be arranged in.

The packet of data may also be formatted to include a checksum field in addition to the packet payload and the packet header formatted in accordance with the arranged header information. Here, the checksum field may be used to indicate whether the formatting of the packet headers have been altered.

The packet of data may adhere to one or more protocols including application protocols such as SIP and HTTP, and/or network transport protocols such as IPv4, IPv6, TCP, UDP, and/or SCTP.

Figure 2:
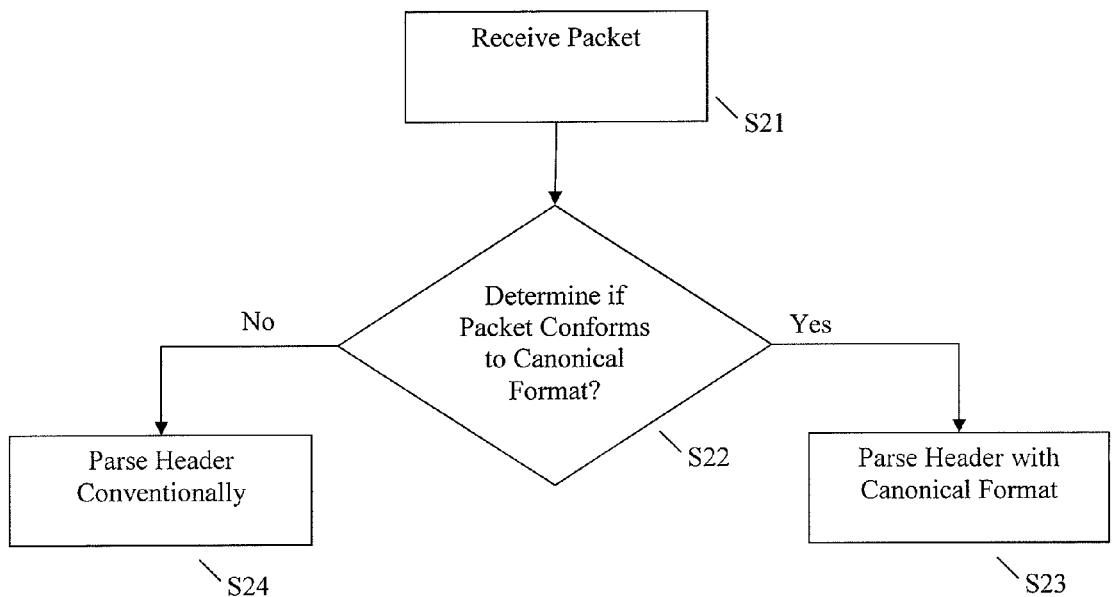
FIG. 2 is a flow chart illustrating a method for processing network traffic that may or may not conform to a canonical format according to an exemplary embodiment of the present invention.

The network traffic so generated may then be processed by a network device that has been designed or adapted to make use of the canonical format. However, such a network device should also have the ability to process conventional network traffic. FIG. 2 is a flow chart illustrating a method for processing network traffic that may or may not conform to a canonical format according to an exemplary embodiment of the present invention. First, a packet of data may be received (Step S21). Then, it may be determined whether the received packet conforms to the predetermined canonical format (Step S22). This determination may be made, for example, by verifying a checksum as described in detail above. If the packet is determined to conform to the predetermined canonical format (Yes, Step S22) then processing of the packet may include parsing the header information of the packet using the prior knowledge of the canonical format (Step S23). If, however, the packet is determined not to conform to the predetermined canonical format (No, Step S22), either because the packet was never arranged in the canonical format or because the packet was at one point arranged in the canonical format but was later rearranged, then the packet may be processed in the conventional sense by parsing the header information in an arbitrary fashion (Step S24) where the arrangement of the headers is not known.

Figure 3:
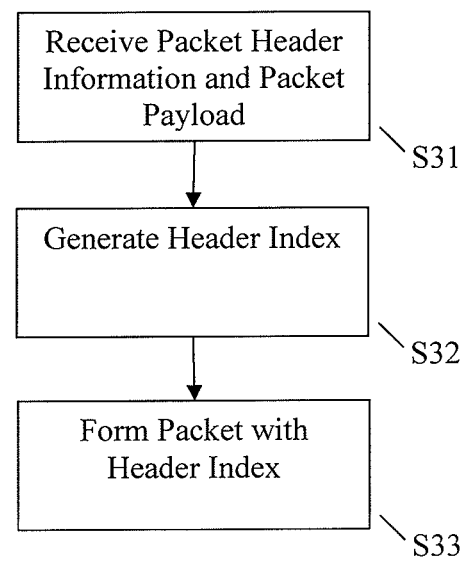
FIG. 3 is a flow chart illustrating a method for generating network traffic that includes a header index according to an exemplary embodiment of the present invention.

As discussed above, exemplary embodiments of the present invention may be able to provide enhanced packet processing without the need for restricting the arrangement of the packet headers to a canonical format. For example, information pertaining to the arrangement of the header information may be stored within a header index. FIG. 3 is a flow chart illustrating a method for generating network traffic that includes a header index according to an exemplary embodiment of the present invention. The network traffic may either originate including the header index, for example, by being generated by a network device enhanced according to an exemplary embodiment of the present invention, for example, as discussed above, or the network traffic may be generated in accordance with the conventional approach and may later be modified to include the header index. In either case, packet header information and a packet payload may be received (Step 31). Then, a header index may be generated based on the formatting of the received packet header information (Step S32). The header index may be generated, for example, to specify a particular order in which packet headers and/or fields are arranged. The header index may be generated, for example, to specify a particular offset of each individual header of the header information. The packet of data may then be formed to include the packet payload, the packet header information, and the header index (Step S33).

The packet of data may also be formatted to include a checksum field in addition to the packet payload, the packet header information, and the header index. Here, the checksum field may be used to indicate whether the formatting of the packet headers or the header index have been altered.

As with the case above, here the packet of data may adhere to one or more protocols including application protocols such as SIP and HTTP, and/or network transport protocols such as IPv4, IPv6, TCP, UDP, and/or SCTP.

Figure 4:
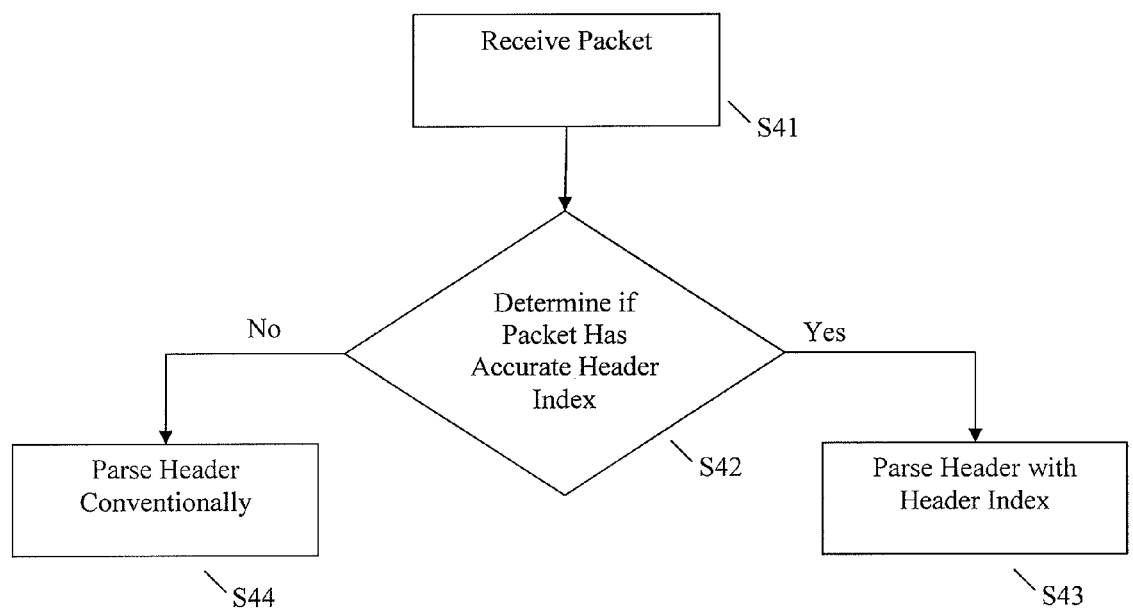
FIG. 4 is a flow chart illustrating a method for processing network traffic that may or may not include a header index according to an exemplary embodiment of the present invention.

The network traffic so generated may then be processed by a network device that has been designed or adapted to make use of the canonical format. However, such a network device should also have the ability to process conventional network traffic. FIG. 4 is a flow chart illustrating a method for processing network traffic that may or may not include a header index according to an exemplary embodiment of the present invention. First, a packet of data may be received (Step S41). Then, it may be determined whether the received packet includes the header index (Step S42). This determination may be made, for example, by verifying a checksum as described in detail above. If the packet is determined to include the header index (Yes, Step S42) then processing of the packet may include parsing the header information of the packet using the prior knowledge of the header index (Step S43). If, however, the packet is determined not to conform to the include the header index (No, Step S42), either because the packet was never created to include the header index or because the packet at one point included the header index but the headers of the packer were later rearranged to thereby render the header index useless, then the packet may be processed in the conventional sense by parsing the header information in an arbitrary fashion (Step S44) where the arrangement of the headers is not known.

As discussed above, the packet of data may also be formatted to include a checksum field in addition to the packet payload, the packet header information, and the header index. Here, the checksum field may be used to indicate whether the formatting of the packet headers or the header index have been altered. Thus checking to determine whether the header index is present may include checking the checksum.

Because a header index would no longer be of use in the event that the packet headers have been changed, the question of whether a packet includes a header index is defined herein as the question of whether the packet includes a header index that accurately represents the current state of the headers. Therefore, a packet that has had its headers changed since the creation of the header index but has not had the header index updated is defined herein as not having a header index. For this reason, the use of the checksum, as discussed above, is well suited for determining whether the packet includes a header index that accurately represents the current state of the headers.

As with the case above, here the packet of data may adhere to one or more protocols including application protocols such as SIP and HTTP, and/or network transport protocols such as IPv4, IPv6, TCP, UDP, and/or SCTP.

FIGS. 5 and 6 are examples of SIP headers for SIP INVITE operations. Only the SIP headers are depicted. The payload that would follow the headers has been omitted for simplicity. A SIP INVITE operation may be performed, for example, when a user dials a phone number to initiate a call on a VoIP phone that uses SIP. The example headers of FIG. 5 and FIG. 6 were generated by different pieces of software, and therefore illustrate different SIP stacks. The example of FIG. 5 was generated by SJPhone, which is an example of a SIP soft phone, i.e. an application that may be executed on a general-purpose operating system that is designed to look like and behaves like a phone. The example of FIG. 6 was generated by Asterisk, which is an example of an open source IP PBX (telephone switch).

Comparing the two examples shows that although both contain substantially the same headers, the order in which the headers appear is different. Both examples start with an INVITE header followed by a Via: header. The third header (header 503) in of the example of FIG. 5 is Content-Length: while in the example of FIG. 6, the third header (header 603) is From: and the Content-Length header field is thirteenth (header 613). The example of FIG. 6 includes all eleven headers of the example of FIG. 5, headers 501-511 corresponding to headers 601-609 and 612-613 of FIG. 6, but not respectively, plus two additional headers, Date: (header 610) and Allow: (header 611) that are not present in the example of FIG. 5. The examples highlight how the order of at least some of the headers can vary. The SIP protocol mandates that the operation, INVITE, in this case, comes first and that the Via: header comes next. The remaining headers can appear in any order.

To canonicalize the header, for example, to put the header in a standard format, all of the headers may be placed in a particular order. For example, the From: header, where present, may be placed immediately follow the via header, the To: header may be placed immediately following the From: header and so on.

The order of the headers is just one example of flexibility inherent in packet formation and would be standardized into only a single permissible format in order for the headers to be canonicalized. Capitalization of the headers is another example of flexibility. As far as the SIP protocol is concerned, the headers To:, to:, TO: and tO: are all identical. SIP also allows a "short" form for several headers. T: is equivalent to To:, F: is equivalent to From: and V: is equivalent to Via:. Exemplary embodiments of the present invention may utilize a standard capitalization arrangement and may disallow the use of short form headers and/or other examples of the ability to express the same header in multiple fashions.

Looking closely at the Via: headers (header 502 of FIG. 5 and header 602 of FIG. 6) reveals that the order of the fields in the header is different in the two examples. In the example of FIG. 5, the rport parameter is followed by branch while in the example of FIG. 6, the branch parameter is followed by rport.

Canonical format may eliminate all options such that the only way for two headers to be identical, as far as the protocol is concerned, is for them to be exactly the same, character for character.

The line numbers in the examples were added for ease of reference. The actual protocol headers do not include line numbers.

Exemplary embodiments of the present invention may add a checksum field. Such a field might be called, for example, "Canonical-checksum:" (followed by the actual checksum value). Protocol implementations that are not familiar with the added checksum field may ignore it according to the protocol specification. Where a header index is added in accordance with an exemplary embodiment of the present invention, the field may be called, for example, "Header-index:" (followed by a numerical value). The numerical value might, for example, specify the offset from the beginning of the packet for each of the fifteen most common SIP headers, or for every known SIP header. Each numerical value might consist of four decimal digits (or three hexadecimal digits) for each offset specified with the offsets simply concatenated together. Many other formats are possible according to exemplary embodiments of the present invention.

Figure 7:
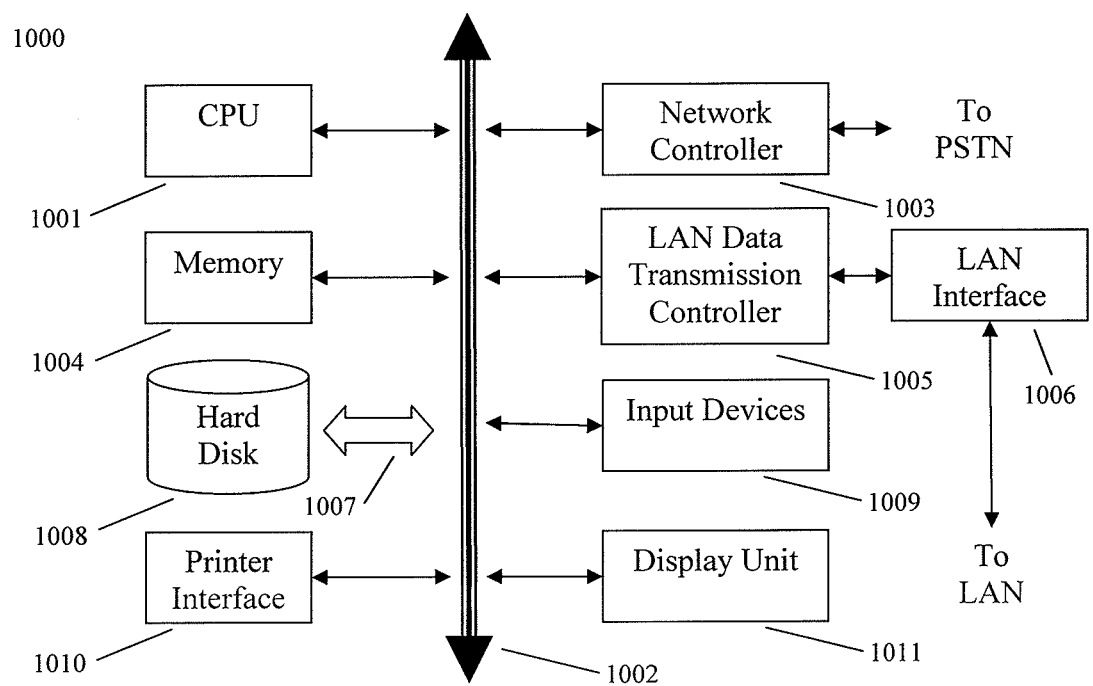
FIG. 7 shows an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for generating network traffic, comprising:
    receiving packet header information and a packet payload conforming to a common protocol;
    arranging the received packet header information in accordance with a canonical format that imposes restrictions on header field order not imposed by the common protocol; and
    forming a packet of data including the packet payload and a packet header formatted in accordance with the arranged header information,
    wherein the canonical format specifies a particular order in which packet headers are to be arranged, and wherein the formed packet of data conforms to the common protocol.

2. The method of claim 1, wherein the packet of data is formatted to include a checksum field in addition to the packet payload and a packet header formatted in accordance with the arranged header information, wherein the checksum field is used to indicate whether the formatting of the packet headers have been altered to no longer conform to the canonical format.

3. The method of claim 1, wherein the common protocol adheres to one or more of a Session Initiation Protocol (SIP), a Hypertext Transport Protocol (HTTP), IPv4, IPv6, CP, UDP, or SCTP.

4. The method of claim 1, wherein the method for generating network traffic is applied to an existing packet of data to convert that existing packet of data into a packet of data having a packet header formatted in accordance with the canonical format.

5. A method for processing network traffic, comprising:
    receiving a packet conforming to a common protocol;
    determining whether the received packet conforms to a canonical format that imposes restrictions on header field order not imposed by the common protocol and specifies a particular order in which packet headers are arranged; and
    when it is determined that the packet conforms to the canonical format, processing the packet by parsing header information of the packet in accordance with the canonical format using knowledge of the order in which the packet headers are arranged, and when it is determined that the packet does not conform to the canonical format, processing the packet by parsing header information of the packet in an arbitrary fashion, wherein parsing header information of the packet in an arbitrary fashion is more computationally expensive than parsing header information of the packet in accordance with the canonical format,
    wherein the common protocol does not specify the order of packet header information.

6. The method of claim 5, wherein determining whether the received packet conforms to the canonical format includes performing a checksum on the header information of the packet to verify that the checksum is equal to a predetermined value.

7. The method of claim 5, wherein determining whether the received packet conforms to the canonical format includes:
    detecting the presence of a checksum value within the received packet;
    computing a checksum over header information of the packet;
    comparing the computed checksum to the checksum value within the received packet; and
    determining that the received packet conforms to the canonical format when the computed checksum equals the checksum value within the received packet.

8. The method of claim 5, wherein the common protocol adheres to one or more of a Session Initiation Protocol (SIP), a Hypertext Transport Protocol (HTTP), IPv4, IPv6, CP, UDP, or SCTP.

9. A method for generating network traffic, comprising:
    receiving packet header information and a packet payload conforming to a common protocol;
    generating a header index based on formatting of the received packet header information; and
    forming a packet of data including the packet payload, the packet header information, and the header index, wherein the header index specifies a canonical format that imposes a particular order in which packet header fields are to be arranged that is not imposed by the common protocol.

10. The method of claim 9, wherein the header index specifies a particular offset of each individual header of the header information.

11. The method of claim 9, wherein the packet of data is formed to include a checksum field in addition to the packet payload, the packet header information, and the header index, and wherein the checksum field is used to indicate whether the formatting of the packet headers have been altered to no longer conform to the canonical format.

12. The method of claim 9, wherein the common protocol adheres to one or more of a Session Initiation Protocol (SIP), a Hypertext Transport Protocol (HTTP), IPv4, IPv6, CP, UDP, or SCTP.

13. The method of claim 9, wherein the method for generating network traffic is applied to an existing packet of data to convert that existing packet of data into a packet of data having conforming to the canonical format.

14. The method of claim 9, wherein the header index further specifies a particular offset of each individual header of the header information.

15. A method for processing network traffic, comprising:
   receiving a packet conforming to a common protocol;
   determining whether the received packet includes a header index specifying a canonical format that imposes a particular order in which packet header fields are to be arranged based on formatting of header information of the received packet; and
   when it is determined that the packet includes the header index, processing the packet by parsing the header information of the packet in accordance with the header index, and when it is determined that the packet does not include the header index, processing the packet by parsing the header information of the packet in an arbitrary fashion, wherein parsing header information of the packet in an arbitrary fashion is more computationally expensive than parsing header information of the packet with the header index,
   wherein the common protocol does not impose restrictions on header field order.

16. The method of claim 15, wherein the header index specifies a particular offset of each individual header of the header information.

17. The method of claim 15, wherein determining whether the received packet includes a header index includes performing a checksum on the protocol headers to verify that the checksum is equal to a predetermined value.

18. The method of claim 15, wherein determining whether the received packet includes the header index includes:
   detecting the presence of a checksum value within the received packet;
   computing a checksum over header information of the packet;
   comparing the computed checksum to the checksum value within the received packet; and
   determining that the received packet includes the header index when the computed checksum equals the checksum value within the received packet.

19. The method of claim 15, wherein the common protocol adheres to one or more of a Session Initiation Protocol (SIP), a Hypertext Transport Protocol (HTTP), IPv4, IPv6, CP, UDP, or SCTP.

* * * * *